United States Patent
Wetzig

(10) Patent No.: US 8,646,315 B2
(45) Date of Patent: Feb. 11, 2014

(54) METHOD AND DEVICE FOR TIGHTNESS TESTING

(75) Inventor: Daniel Wetzig, Köln (DE)

(73) Assignee: Inficon GmbH, Cologne (DE)

( * ) Notice: Subject to any disclaimer, the term of this patent is extended or adjusted under 35 U.S.C. 154(b) by 293 days.

(21) Appl. No.: 12/744,776

(22) PCT Filed: Nov. 27, 2008

(86) PCT No.: PCT/EP2008/066346
§ 371 (c)(1),
(2), (4) Date: May 26, 2010

(87) PCT Pub. No.: WO2009/068614
PCT Pub. Date: Jun. 4, 2009

(65) Prior Publication Data
US 2010/0313634 A1    Dec. 16, 2010

(30) Foreign Application Priority Data

Dec. 1, 2007 (DE) .......................... 10 2007 579 448

(51) Int. Cl.
*G01M 3/34*  (2006.01)
(52) U.S. Cl.
USPC .......................................................... 73/49.3
(58) Field of Classification Search
USPC ................... 73/40, 40.7, 49.2, 49.3
See application file for complete search history.

(56) References Cited

U.S. PATENT DOCUMENTS

| | | | |
|---|---|---|---|
| 3,585,845 A | | 6/1971 | Cornell et al. ................. 73/40.7 |
| 3,855,844 A | * | 12/1974 | Craig .............................. 73/40.7 |
| 3,888,111 A | * | 6/1975 | Craig .............................. 73/40.7 |
| 4,785,666 A | * | 11/1988 | Bergquist ....................... 73/40.7 |
| 4,919,599 A | * | 4/1990 | Reich et al. .................. 417/423.4 |
| 4,984,450 A | | 1/1991 | Bürger ............................ 73/40.7 |
| 5,131,263 A | * | 7/1992 | Handke et al. ................. 73/40.7 |
| 5,361,626 A | * | 11/1994 | Colligan et al. ................ 73/40.7 |
| 5,447,055 A | | 9/1995 | Thompson et al. ............ 73/49.2 |
| 5,553,483 A | * | 9/1996 | Armentrout et al. ............. 73/40 |
| 6,450,012 B1 | * | 9/2002 | Mayer et al. .................... 73/49.3 |
| 7,033,142 B2 | * | 4/2006 | Conrad et al. ................. 417/201 |
| 7,082,813 B2 | * | 8/2006 | Grosse-Bley et al. ......... 73/40.7 |
| 7,448,256 B2 | * | 11/2008 | Jenneus et al. ................. 73/49.2 |
| 2005/0223779 A1 | | 10/2005 | Perkins et al. ................. 73/40.7 |

FOREIGN PATENT DOCUMENTS

| | | |
|---|---|---|
| WO | WO 2005/054806 | 6/2005 |
| WO | WO 2005054806 A1 * | 6/2005 |

OTHER PUBLICATIONS

International Search Report for PCT/EP2008/066346 dated Mar. 5, 2009.

* cited by examiner

*Primary Examiner* — John Fitzgerald
(74) *Attorney, Agent, or Firm* — Ohlandt, Greeley, Ruggiero & Perle, LLP

(57) ABSTRACT

A test subject, which is filled with test gas, is placed in a testing chamber, which can be evacuated. A carrier gas is conducted into the testing chamber, so that a gas mixture made of carrier gas and test gas forms therein. The gas mixture is suctioned out of the testing chamber by a compressor pump. A testing gas sensor is connected to the outlet of the compressor pump. The test gas is contained in the compressed gas mixture at a partial pressure which is increased by the compression ratio. In this manner, the sensitivity of the test gas recognition is increased and/or the time constant of the measurement is shortened.

1 Claim, 4 Drawing Sheets

METHOD AND DEVICE FOR TIGHTNESS TESTING

BACKGROUND

1. Field of the Disclosure

The disclosure relates to a method for tightness testing wherein a test object filled with test gas is inserted into a test chamber and wherein, by use of a test gas sensor, a gas mixture made of a test gas withdrawn from the test chamber and of a carrier gas, is examined for the presence of test gas.

2. Discussion of the Background Art

The disclosure further relates to a method for tightness testing wherein an evacuated test object is exposed to the external influence of a test gas, and wherein, by use of a test gas sensor, a gas mixture made of a test gas withdrawn from the test object and of a carrier gas, is examined for the presence of test gas.

A known method for integral tightness testing provides that the test object filled with test gas is to be placed into a test chamber. The test chamber will be evacuated by a vacuum system, with a test gas sensor being integrated in said vacuum system. A typical test gas is helium, which presently is detected with the aid of a mass spectrometer. Testing for helium will require high vacuum conditions wherein the pressure p has to be less than $10^{-4}$ mbar.

A further method for integral tightness testing provides that the test object will be evacuated and be exposed to the external influence of a test gas. Using a vacuum system connected to the test object, it will be possible to perform a mass spectroscopic detection of the test gas.

Tightness testing systems have a time constant which normally is dictated by the application. The time constant indicates the time period until stable signal conditions are reached. It is determined by the volume of the test chamber and by the test gas suction capacity at the test chamber:

$$\tau = V/S$$

τ: System time constant (63%-time)
V: Volume of the test chamber
S: Suction capacity of the pump for the test gas The smallest leak rate measurable by a system is dependent on the smallest test-gas partial pressure that the system is able to detect. The test gas pressure prevailing in the respective application is determined as follows:

$$p = Q/S$$

p: Partial pressure of the test gas
Q: Leakage rate of the test gas from the test object
S: Suction capacity of the pump for the test gas Herein, an antagonism exists: it is not possible to increase the test-gas partial pressure and simultaneously reduce the time constant. A large test-gas suction capacity, although indeed effective to reduce the signal reaction time, will also reduce the test gas pressure and thus the sensitivity of the system.

Described in WO 2005/054806 A1 (Sensistor) is a vacuum test system according to the preamble of the respective claims wherein a test gas is to be introduced into a test chamber or into the test object. Into the respective other one of said two cavities, a carrier gas is inserted. If a leak should happen to exist on the test object, test gas will enter the carrier gas flow and be conveyed together therewith to a compressor pump. Connected to the outlet of the pump is a test gas sensor operating under atmospheric pressure. Applying the carrier gas method, the test-gas partial pressure of the compressed gas mixture is measured downstream of the pump. Thereby, a high system sensitivity can be achieved because the test-gas partial pressure of the compressed gas behind the pump is high. By the compressing pump, the total pressure existing in the test chamber and respectively in the interior of the test object will be increased to 1000 mbar at the pump outlet.

It is an object of the disclosure to provide a method for tightness testing wherein the quantity of the required test gas is reduced.

SUMMARY

The carrier gas is supplied to the flow of the test gas downstream of the test chamber accommodating the test object.

The test gas can be supplied e.g. to a first pump following the test chamber when viewed in the direction of the test gas flow, or to a site between a first pump and a subsequent second pump.

With the disclosure, a high sensitivity of the test gas detection is achieved while the carrier gas flow will be kept low.

A second variant of the disclosure is described as follows. According to this variant, the test gas sensor is arranged at, or upstream of, the final stage of a multi-stage pump arrangement. In contrast to the state of the art wherein the test gas sensor is located at the end of a pump arrangement at atmospheric pressure, the disclosure provides, within a multi-stage pump arrangement, to arrange the test gas sensor at a position located farther toward the test chamber. In this manner, the advantage of an abbreviated measuring time is achieved because the conveyance time of the test gas from the test chamber to the measurement sensor will be shortened.

A third variant of the method of disclosure is described as follows. This claim provides exposure of the test object to the ambient atmosphere without a surrounding test chamber, and the use a test gas gun for generating the atmosphere containing the test gas. An advantage herein resides in that no test chamber will be needed. Further, the atmosphere containing the test gas is generated in a limited surface area on the test object, thus facilitating the identification of the site where a leak has been detected.

A fourth variant of the method of disclosure is described as follows. According to this variant, it is provided, in a device for tightness testing, that the pump arrangement will generate a high pressure situated above the atmospheric pressure and that the test gas sensor is connected to said high pressure. Advantageously, compressing of the gas mixture will be performed beyond the atmospheric pressure, resulting in a higher compressing of the test gas as well. This leads to is a higher partial pressure of the test gas, with the consequence that the pressure measurement will be performed with higher sensitivity.

Generally, in the disclosure, use is made of the carrier gas method, with the test-gas partial pressure of the compressed gas mixture being measured downstream of the conveying unit provided for compressing the gas. This makes it possible to reach a high system sensitivity because the test-gas partial pressure of the compressed gas is high. It is a prerequisite for the method of the disclosure that the test gas sensor must be capable of detecting the partial pressure of the test gas independently from the total pressure of the test gas. Such selective partial-pressure sensors for measuring the partial pressure independently from the total pressure are already known, e.g. in the form of a quartz-window sensor.

The compressor pump is operative to increase the total pressure prevailing in the test chamber and respectively in the interior of the test object to 1,000 mbar at the pump outlet. The ratio between the pressures upstream and downstream of the pump is the compression ratio. In the compression step, the concentration in the conveying medium is maintained. Thus, during compression, the test-gas partial pressure in the conveyed gas mixture will increase by the compression ratio.

Optimum sensitivity is accomplished if the gas flow guided to the sensor does not exceed the carrier gas flow and if the carrier gas flow is selected to be as small as possible. Optionally, the conveyed gas can be further compressed by a compressor, with the effect that the total pressure will be above 1,000 mbar. Thereby, also the test-gas partial pressure will be further increased.

The disclosure allows for a fast system reaction time (low time constant) with simultaneous high system sensitivity.

Said higher test-gas partial pressure can be utilized for improving the detection limit of the system or for reducing the measuring time. The pressure in the test chamber can be reduced as desired, without the risk of such a reduction exerting an influence on the working pressure upstream of the test gas sensor behind the compressor pump. This offers the possibility of reducing the exchange time in the test chamber by lowering the pressure, without causing a loss in sensitivity. Finally, by lowering the working pressure in the test chamber, while also the carrier gas flow will be proportionately lowered at the same time, it is rendered possible to enhance the sensitivity of the detection system without adversely affecting the exchange time.

The test gas can be any gas type for which a test gas sensor is available that can be operated independently from the total pressure. Suitable gases for use as a test gas are helium or hydrogen.

The carrier gas can be selected among all gases, also those that have been contaminated by a known test gas concentration. Suitable test gases are nitrogen or air, for instance.

Embodiments of the disclosure will be described in greater detail hereunder with reference to the drawings.

DETAILED DESCRIPTION OF THE PREFERRED EMBODIMENT

Figure 1:
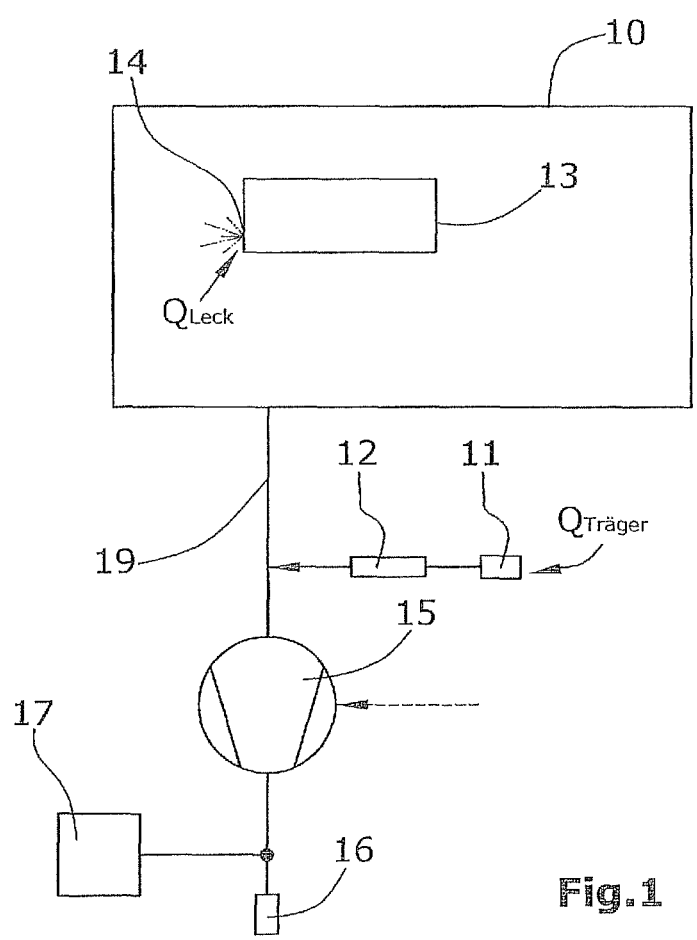
FIG. 1 is a schematic illustration of a method according to the first variant of the disclosure.

In the variant of the disclosure illustrated in FIG. 1, a test chamber 10 is provided which is closed in a vacuum-tight manner.

Into said test chamber 10, a test object 13 has been inserted. The test object is a hollow body which is to be tested for leak-tightness. For this purpose, the test object 13 has been filled with a test gas, e.g. with helium. It be assumed herein that the test object 13 has a leak 14, with test gas escaping from said leak into the evacuated test chamber 10. The escaping test gas flow is $Q_{leak}$.

Connected to test chamber 10 via a suction line 19 is a suctioning compressor pump 15 for removal of the gas. Said compressor pump is a compressor whose gas outlet 16 leads into the atmosphere and will supply a total pressure $P_{tot}$=1,000 bar. Suction line 19 is connected to a carrier gas inlet 11 arranged in series with a flow sensor 12. The carrier flow at carrier gas inlet 11 is marked by $Q_{carrier}$. Within suction line 19, the test gas will mix with the carrier gas, resulting in a gas mixture. The portion of test gas in the gas mixture is $$c = \frac{Q_{leak}}{Q_{carrier}}$$

The helium partial pressure $p_{He}$ is $$p_{He} = c \cdot p_{tot}$$

It is evident that, due to the high total pressure, also $p_{He}$, is relatively high. A test gas sensor 17 is connected to the outlet of compressor pump 15. Said test gas sensor is of the type operating at atmospheric pressure (1,000 mbar), e.g. a helium sensor of the mark "Wise Technology" of the applicant. Another option is a radiation-spectroscopic sensor as used e.g. in the leak detection apparatus HLD 5000 of the applicant, or a chemical test gas sensor. Such a sensor is described in DE 10 2004 034 381 A.

The suction capacity S at the outlet of test chamber 10 can be increased by an auxiliary pump connected to said outlet and operating parallel to compressor pump 15. Thereby, the measuring time and respectively the reaction time can be shortened without the penalty of a reduced sensitivity.

Figure 2:
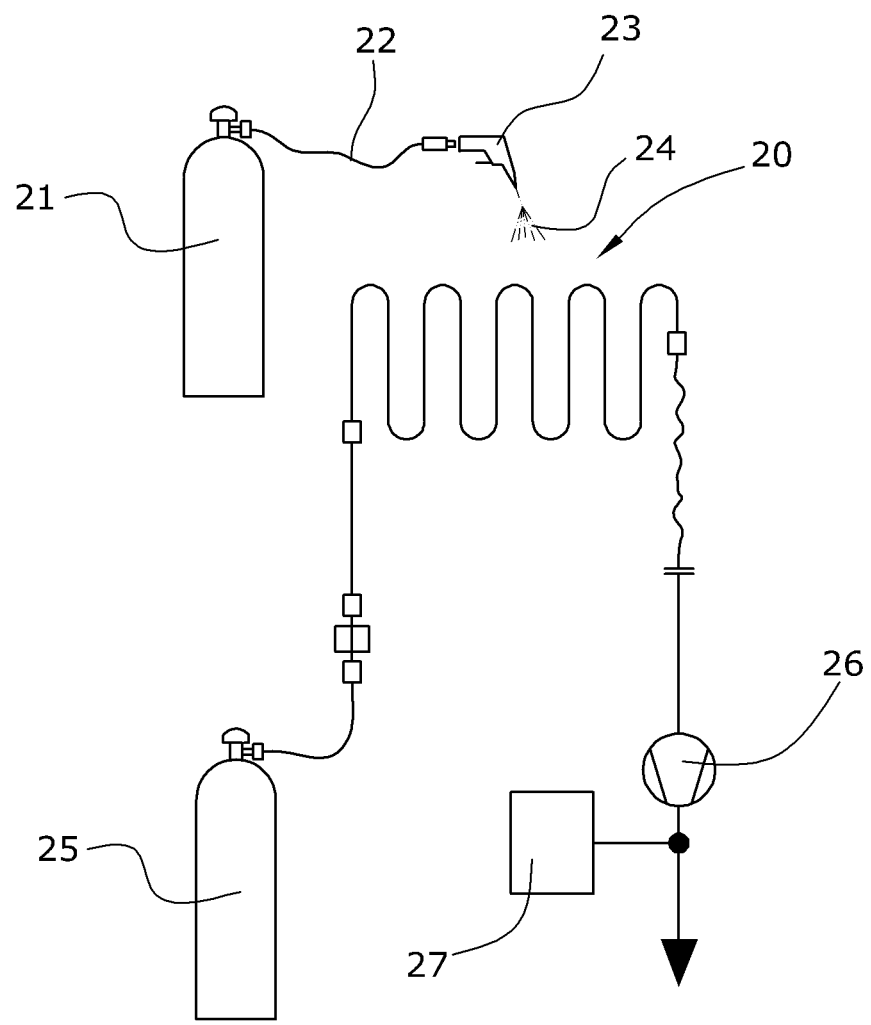
FIG. 2 is a schematic illustration of a method according to the third and fourth variants of the disclosure.

FIG. 2 illustrates an example of the third method variant wherein no test chamber is provided. In this example, the test object is a pipe conduit, e.g. a pipe coil, which is to be tested for leak tightness. For this purpose, the evacuated test object 20, without being surrounded by a test chamber, will be exposed to the external influence of a test gas. The test gas, e.g. helium (He), is to be supplied via a flexible hose 22 from a test gas source 21 to a test gas gun 23 operative to generate a spray cone 24 for spraying the test object. Thereby, an atmosphere containing test gas will be generated on an outer side of the test object.

One end of test object 20 is connected to a carrier gas source 25 which in the present example is provided to supply $N_2$ as a carrier gas. The opposite end of the test object is connected to a suctioning compressor pump 26 which will generate an output pressure of 1,000 mbar and convey the same into the atmosphere. Also in this variant, a helium sensor 27, corresponding to helium sensor 17 of the first embodiment, is connected to the output of pump 26.

In the following table, a comparison is presented between a conventional vacuum leak detection method wherein the test gas sensor operates under vacuum conditions, and the carrier gas method of the disclosure wherein the test gas sensor is connected to the pressure side of a compressor pump:

|  | Vacuum leak search method | Carrier gas method (invention) |
|---|---|---|
| Time constant | $\tau = V/S$ | $\tau = p \cdot V/Q_{carrier}$ |
| Partial pressure | $p_{He} = Q/S$ | $p_{He} = P_{tot} \cdot c \mid c = Q_{leak}/(Q_{carrier} + Q_{leak})$ |
|  | $V = 1$ ltr.$\mid S = 1$ l/s$\mid Q_{leak} = 1 \cdot 10^{-8}$ mbar l/s$\mid Q_{carrier} = 600$ sccm$\mid p = 10$ mbar | |
| Time constant | $\tau = 1$ s | $\tau = 1$ s |
| Partial pressure | $p_{He} = 1 \cdot 10^{-8}$ mbar | $p_{He} = 1 \cdot 10^{-6}$ mbar ($p_{sensor} = 1000$ mbar) |

From the above table, it can be gathered that, based on the indicated parameters, the test-gas partial pressure in the method of the disclosure is higher by the factor 100 so that also the sensibility is correspondingly increased. On the other hand, with the sensitivity being the same, the time constant indicating the response time can be shortened.

Figure 3:
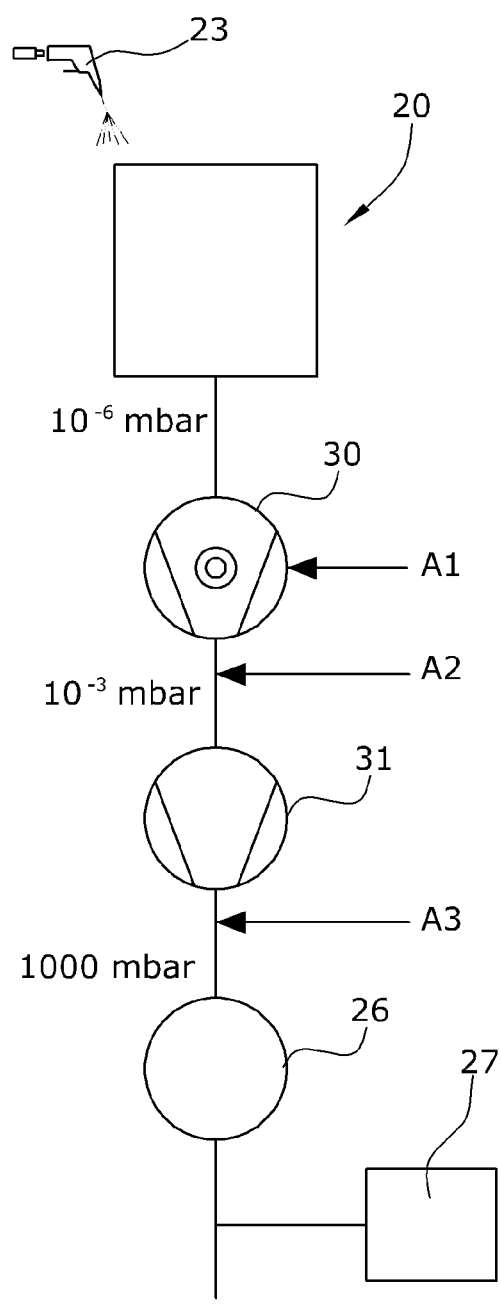
FIG. 3 is a schematic illustration of a modified method according to the first, third and fourth variants of the disclosure.

In the variant according to FIG. 3, the test object 20 is a to-be-tested chamber which is desired to be sealingly closeable. Said chamber will be evacuated by a vacuum pump 30, and, by use of a test gas gun 23, an atmosphere containing test gas will be generated outside of test object 20. In the illustrated example, the vacuum is $10^{-6}$ mbar. Said vacuum pump 30 is a component of the pump arrangement 18 comprising a serial arrangement of a plurality of pumps 30,31. To the outlet of vacuum pump 30, a prevacuum pump 31 is connected. The prevacuum herein is $10^{-3}$ mbar. Said prevacuum pump will supply the gas under atmospheric pressure (1000 mbar). In the illustrated example, a compressor pump 26 is connected to the outlet of prevacuum pump 31 for further compressing the gas above the atmospheric pressure. The test gas sensor 27 is connected to the outlet of said compressor pump 26.

Figure 1A:
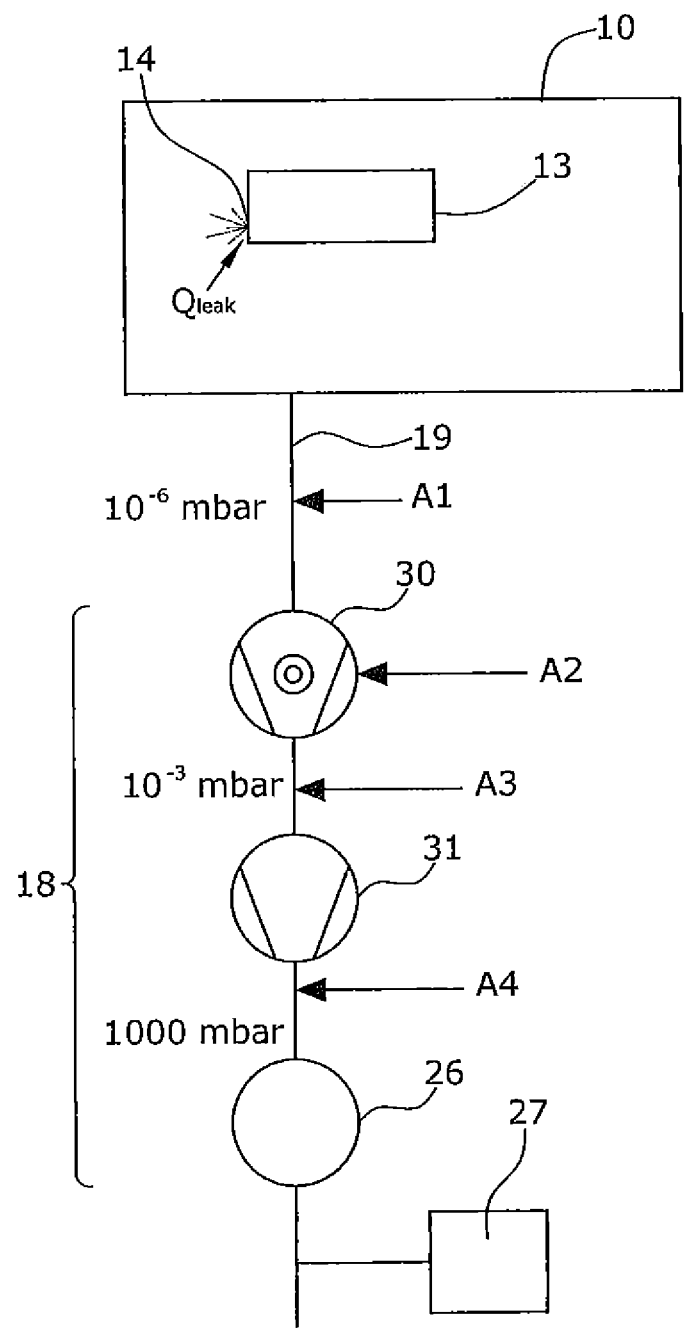
FIG. 1A is a schematic illustration of a method combining the features of the variants shown in FIGS. 1 and 3.

According to FIG. 1A, suction line 19 is connected to a pump arrangement 18 comprising a serial arrangement of a first pump 30 and a second pump 31. To the outlet of a second pump 30, a pre-vacuum pump 31 is connected. In the illustrated example, a third pump 26 is connected to the outlet of pre-vacuum pump 31. The test gas sensor 27 is connected to the outlet of the third pump 26.

The carrier gas does not necessarily have to be supplied to said suction line 19 provided with connector A1. It can also be supplied at any desired site along the transport path of the suctioned gas, e.g. at a connector A2 provided on the housing of vacuum pump 30, or at a connector A3 at the outlet of vacuum pump 30, or at a connector A4 of pump 31.

Figure 4:
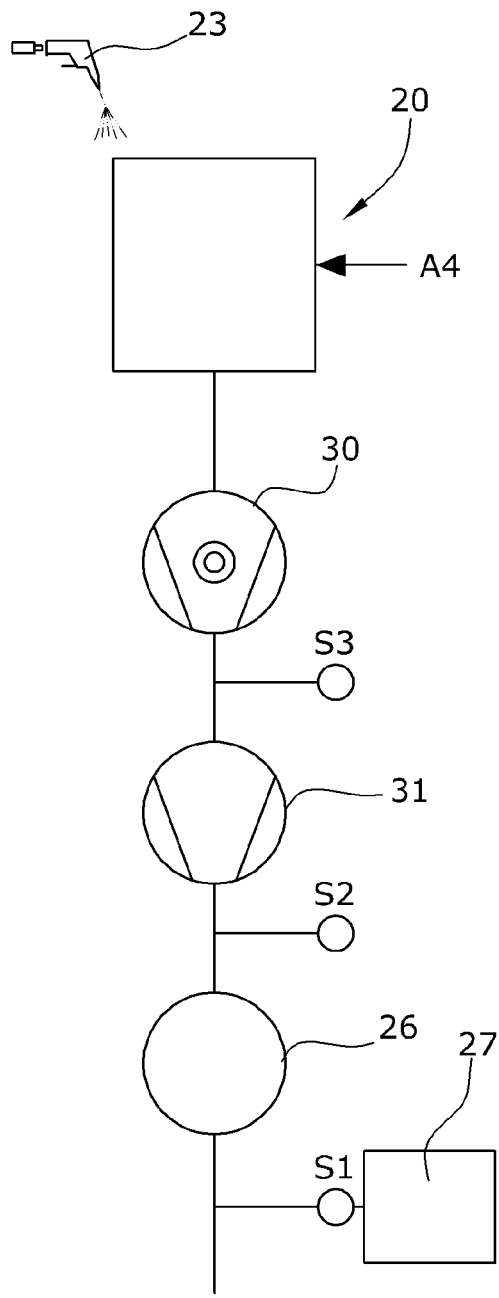
FIG. 4 shows a variant according to the second and third variants of the disclosure.

The variant according to FIG. 4 corresponds to that shown in FIG. 3 while, herein, the carrier gas connector A4 is provided on the test object 20. The test gas sensor 27 can be connected to connector S1 or connector S2. It is important merely that the sensor be positioned on, or upstream of, the final stage of the multi-stage pump arrangement 18 so that it will evaluate the compressed gas mixture. In the present example, the carrier gas is supplied to test object 20 via connector A5 while, alternatively, it can also be supplied to any one of connectors A1 to A4 shown in FIG. 3.

The invention claimed is:

1. A method for tightness testing, comprising:
   filling a test object with a test gas;
   inserting the test object into a test chamber; and
   examining a gas mixture made of an amount of the test gas that is withdrawn from the test chamber and of a carrier gas for the presence of the test gas by use of a test gas sensor, wherein the test gas sensor is operable at atmospheric pressure, and located in the flow of the gas mixture and downstream of a compression pump, wherein the carrier gas is supplied to the flow of the test gas through a suction line downstream of the test chamber, in order to keep the carrier gas flow low and the sensitivity of the gas detection high, and
   wherein the test gas sensor measures the presence of test gas in the output of the compression pump for tightness testing of the test object.

* * * * *

UNITED STATES PATENT AND TRADEMARK OFFICE
CERTIFICATE OF CORRECTION

PATENT NO. : 8,646,315 B2  
APPLICATION NO. : 12/744776  
DATED : February 11, 2014  
INVENTOR(S) : Daniel Wetzig Page 1 of 1

It is certified that error appears in the above-identified patent and that said Letters Patent is hereby corrected as shown below:

On the title page item (30), please correct "10 2007 579 448" To "10 2007 057 944.8."

Signed and Sealed this
Second Day of September, 2014

Michelle K. Lee
*Deputy Director of the United States Patent and Trademark Office*